(12) United States Patent
Narimatu et al.

(10) Patent No.: US 8,908,199 B2
(45) Date of Patent: Dec. 9, 2014

(54) IMAGE PROCESSING APPARATUS DISPLAYING KEY FOR SETTING ITS OWN FUNCTION

(75) Inventors: Eiichi Narimatu, Toyokawa (JP); Takashi Oikawa, Toyohashi (JP); Shinichi Asai, Gamagori (JP); Hiroshi Iwamoto, Toyohashi (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 271 days.

(21) Appl. No.: 13/237,524

(22) Filed: Sep. 20, 2011

(65) Prior Publication Data

US 2012/0069377 A1    Mar. 22, 2012

(30) Foreign Application Priority Data

Sep. 21, 2010   (JP) ................................ 2010-210603

(51) Int. Cl.
*G06K 15/00* (2006.01)
*G06F 3/12* (2006.01)
*H04N 1/00* (2006.01)

(52) U.S. Cl.
CPC ......... *H04N 1/00411* (2013.01); *H04N 1/0044* (2013.01); *H04N 1/00501* (2013.01); *H04N 1/00474* (2013.01); *H04N 1/00482* (2013.01)
USPC ........ 358/1.13; 358/1.14; 358/1.15; 358/1.16

(58) Field of Classification Search
None
See application file for complete search history.

(56) References Cited

U.S. PATENT DOCUMENTS

2005/0264833 A1* 12/2005 Hiraoka et al. ................ 358/1.9
2007/0195064 A1*  8/2007 Morioka ....................... 345/173

FOREIGN PATENT DOCUMENTS

| JP | 2001-010158 A | 1/2001 |
|----|---------------|--------|
| JP | 2004029350 A  | 1/2004 |
| JP | 2004-306478 A | 11/2004 |
| JP | 2005241764 A  | 9/2005 |
| JP | 2005267259 A  | 9/2005 |
| JP | 2006-085683 A | 3/2006 |
| JP | 2006205487 A  | 8/2006 |
| JP | 2007293416 A  | 11/2007 |
| JP | 2008234001 A  | 10/2008 |
| JP | 2010-118763 A | 5/2010 |

OTHER PUBLICATIONS

Machine translation of JP Pub 2006205487 to Miyamoto Kenji.*

(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image processing apparatus implements a plurality of functions and includes a display device. The plurality of functions include a function belonging to a first group and a function belonging to a second group. A selection accepting unit accepts selection of any of the first group and the second group. A first display control unit causes the display device to display on a display screen, a plurality of first keys corresponding to respective functions belonging to the first group, regardless of which of the first group and the second group has been selected. A second display control unit causes, when the second group is selected, the display device to display in a second region of the display screen other than a first region where the first keys are displayed, second keys corresponding to respective functions belonging to the second group.

12 Claims, 13 Drawing Sheets

(56) References Cited

OTHER PUBLICATIONS

Machine translation in english for JP2006205487 to Miyamoto Kenji.*
Japanese Office Action, dated Sep. 18, 2012, with English-language translation.
Office Action from the Japan Patent Office dated Apr. 23, 2013, issued in corresponding Japanese Patent Application No. 2010-210603, with English translation thereof. (7 pages).
Office Action (Notice of Grounds of Rejection) issued on Dec. 3, 2013, by the Japanese Patent Office in corresponding Japanese Patent Application No. 2010-210603 and an English translation of the Office Action. (7 pages).

* cited by examiner

IMAGE PROCESSING APPARATUS DISPLAYING KEY FOR SETTING ITS OWN FUNCTION

This application is based on Japanese Patent Application No. 2010-210603 filed with the Japan Patent Office on Sep. 21, 2010, the entire content of which is hereby incorporated by reference.

BACKGROUND OF THE INVENTION

1. Field of the Invention

The present invention relates to an image processing apparatus and particularly to an image processing apparatus displaying a key for setting its own function.

2. Description of the Related Art

In recent years, such image processing apparatuses as a digital copying machine and an MFP (Multi-Functional Peripheral) have more functions and a large number of functions are provided in one apparatus. Meanwhile, a display space on an operation panel included in the MFP is limited and hence it is difficult to simultaneously display keys corresponding to all functions (setting) provided in the MFP on the operation panel. If simultaneous display of all function keys on the operation panel is attempted, keys become smaller in size and an interval between the keys inevitably becomes narrow. Consequently, an erroneous operation is more likely and operability becomes poor.

In order to address this, document 1 (Japanese Laid-Open Patent Publication No. 2004-306478) discloses a technique for displaying a plurality of windows in an image forming apparatus. In the image forming apparatus, when a function key in a function setting screen (a function setting main screen) is selected, a function setting sub screen corresponding to the selected function key is displayed in a manner superimposed on a part of the function setting main screen.

In addition, document 2 (Japanese Laid-Open Patent Publication No. 2006-085683) discloses a technique substantially the same as in document 1 that a plurality of windows are displayed in a computer system having a graphical user interface.

According to these techniques, a new setting screen (a sub window) is displayed in response to a user's operation, in a manner superimposed on an original setting window (a main window), and hence more complicated setting can be made in a limited display space.

According to the techniques described in document 1 and document 2, however, for example, when the user selects a key in connection with a "function 1" in the main window, a sub window for making detailed setting in connection with "function 1" is displayed in a manner superimposed on the main window. In such a situation, the user can make detailed setting for "function 1", whereas the user cannot see a key displayed in a region in the main window under the sub window (that is, on which the sub window is superimposed). In addition, the user cannot operate a key displayed in that region either.

In general, in many cases, functions (keys) more frequently used by the user (that is, relatively of higher importance) than keys displayed in the sub window are displayed in the main window.

Therefore, according to the conventional techniques as in document 1 and document 2 that a sub window is displayed in response to a user's operation in the main window in a manner superimposed on the main window, once the sub window is displayed, the user can no longer see or operate a function of relatively high importance displayed under the sub window. In this regard, the conventional techniques have not been satisfactory in operability.

SUMMARY OF THE INVENTION

The present invention was made in view of such circumstances, and an object of the present invention is to provide an image processing apparatus having a plurality of functions, which allows setting in connection with all functions while operability of some functions among the plurality of functions is improved, as well as a method and a program for controlling the same.

An image processing apparatus according to a certain aspect of the present invention is an image processing apparatus capable of implementing a plurality of functions, the plurality of functions including a function belonging to a first group and a function belonging to a second group. The image processing apparatus includes a display device, a selection accepting unit for accepting selection of any of the first group and the second group, a first display control unit for causing the display device to display on its display screen a plurality of first keys corresponding to respective functions belonging to the first group regardless of which of the first group and the second group has been selected, and a second display control unit for causing, when the second group is selected, the display device to display in a second region in the display screen other than a first region where the first keys are displayed, second keys corresponding to respective functions belonging to the second group.

A storage medium according to another aspect of the present invention is a storage medium storing a program executed in a computer mounted on an image processing apparatus including a display device and capable of implementing a plurality of functions, the plurality of functions including a function belonging to a first group and a function belonging to a second group. The program causes the computer to perform the steps of accepting selection of any of the first group and the second group, causing the display device to display on its display screen a plurality of first keys corresponding to respective functions belonging to the first group regardless of which of the first group and the second group has been selected, and causing, when the second group is selected, the display device to display in a second region in the display screen other than a first region where the first keys are displayed, second keys corresponding to respective functions belonging to the second group.

A method of controlling an image processing apparatus according to yet another aspect of the present invention is a control method for controlling an image processing apparatus including a display device and capable of implementing a plurality of functions, the plurality of functions including a function belonging to a first group and a function belonging to a second group. The method includes the steps of the image processing apparatus accepting selection of any of the first group and the second group, the image processing apparatus causing the display device to display on its display screen a plurality of first keys corresponding to respective functions belonging to the first group regardless of which of the first group and the second group has been selected, and the image processing apparatus causing, when the second group is selected, the display device to display in a second region in the display screen other than a first region where the first keys are displayed, second keys corresponding to respective functions belonging to the second group.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
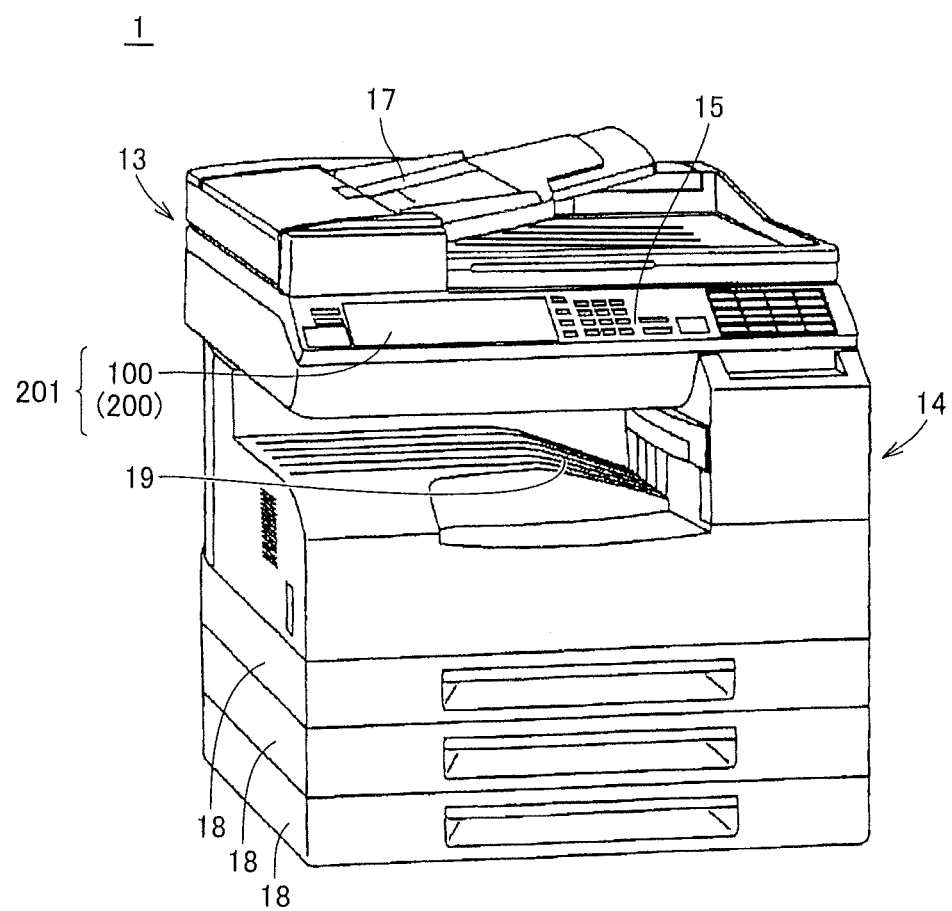
FIG. 1 is a diagram showing appearance of an MFP representing one embodiment of the present invention.

An embodiment of an image processing apparatus according to the present invention will be described hereinafter in detail with reference to the drawings. In each figure, an element having the same function has the same reference character allotted and description thereof will not be repeated.

FIG. 1 is a diagram showing appearance of an MFP 1 representing one embodiment of the present invention.

Referring to FIG. 1, MFP 1 includes a plurality of hard keys 15 accepting input of an operation instruction for various types of processing or characters and numbers.

In addition, MFP 1 includes a display 100 displaying an operation screen, information on an image to be subjected to image processing, and the like. A touch sensor 200 is layered on display 100, and display 100 and touch sensor 200 constitute a touch panel 201. MFP 1 displays an operation screen including a setting key and the like on display 100. Moreover, MFP 1 accepts user's input for setting by sensing a contact operation onto touch sensor 200 in a display region of a setting key. Further, MFP 1 accepts user's input for setting by sensing an operation onto hard key 15.

MFP 1 includes a scanner portion 13 and a printer portion 14. Scanner portion 13 obtains image data by photoelectrically scanning a document. Printer portion 14 prints an image on a sheet of paper based on image data obtained by scanner portion 13 or image data received from external equipment (a PC or the like) connected through a network.

Furthermore, MFP 1 includes on its upper surface of a main body, a feeder portion 17 sending a document to scanner portion 13, includes in its lower portion of the main body, a paper feed portion 18 supplying paper to printer portion 14, and includes in its central portion, a tray 19 on which a sheet of paper having an image printed by printer portion 14 is ejected.

Figure 2:
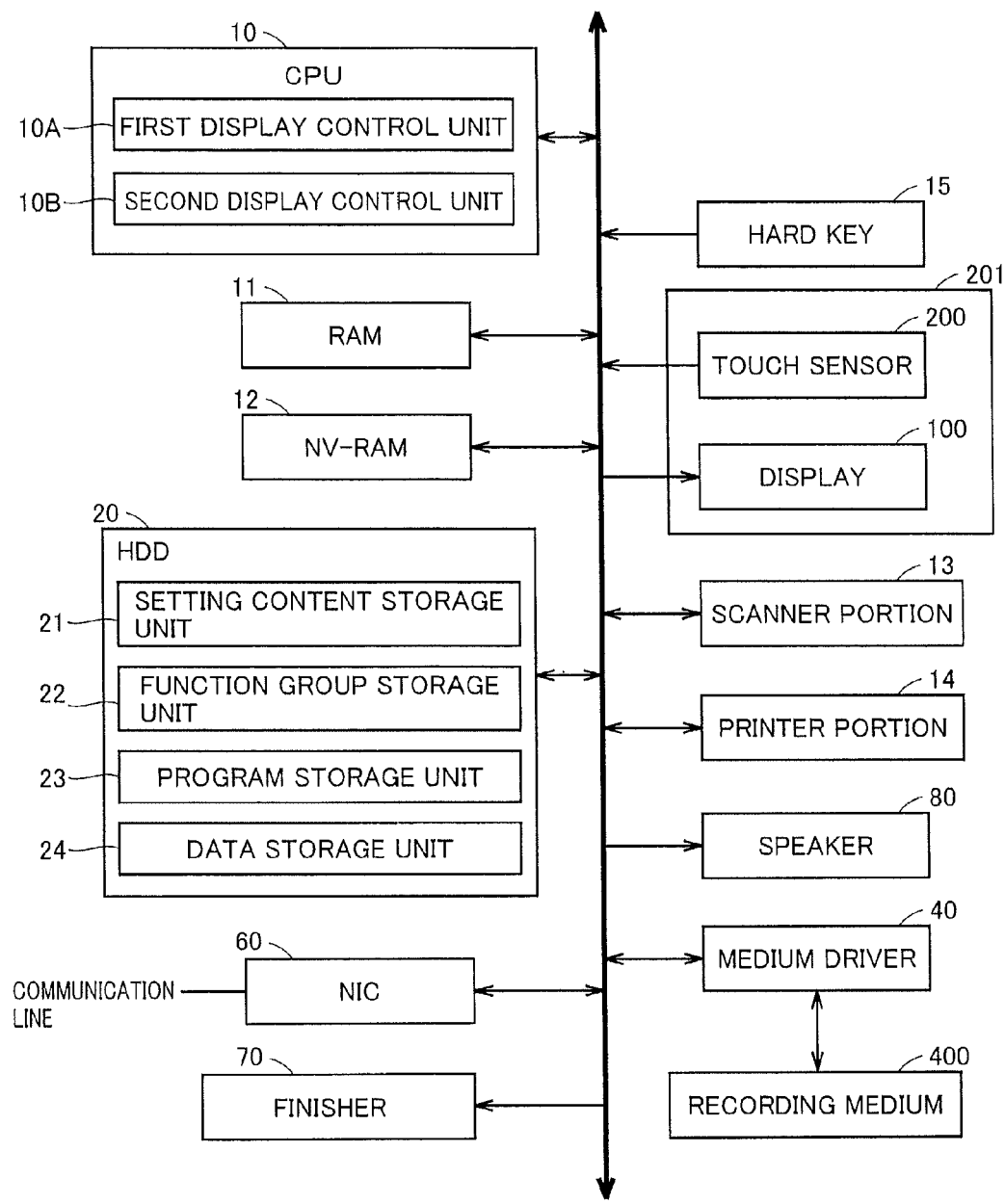
FIG. 2 is a block diagram of the MFP in FIG. 1.

FIG. 2 is a block diagram of MFP 1.

Referring to FIG. 2, MFP 1 includes a CPU (Central Processing Unit) 10 for overall control of an operation of MFP 1, a RAM (Random Access Memory) 11 serving as a work area of CPU 10, and an NV (Non Volatile)-RAM 12 storing data on initial setting and the like of the MFP.

MFP 1 further includes an HDD (Hard Disc Drive) 20. HDD 20 includes a setting content storage unit 21 storing setting contents of a function of MFP 1, a function group storage unit 22 storing to which group each function of MFP 1 belongs, a program storage unit 23 storing a program executed by CPU 10, and a data storage unit 24 storing various types of data.

CPU 10 includes as its functions, a first display control unit 10A controlling a manner of display of a plurality of function keys belonging to a first group corresponding to a Basic 1 group and a Basic 2 group which will be described later and a pop-up window displayed in association therewith and a second display control unit 10B controlling a manner of display of a plurality of function keys belonging to a second group corresponding to an Application group which will be described later and a pop-up window displayed in association therewith. First display control unit 10A and second display control unit 10B are implemented, for example, by CPU 10 executing a program stored in program storage unit 23. It is noted that these may be implemented by hardware such as an LSI (Large Scale Integration) mounted dedicated for MFP 1.

Setting content storage unit 21 stores for each function, setting contents of that function. Table 1 schematically shows exemplary storage contents in setting content storage unit 21.

TABLE 1

| Function | A | B | C | D | E | F | G | H |
|---|---|---|---|---|---|---|---|---|
| Setting Contents | A-1 | B-1 | C-4 | D-2 | E-3 | F-1 | G-2 | H-1 |
| Function | I | J | R | S | K | L | M | N |
| Setting Contents | I-2 | J-3 | R-1 | S-1 | K-1 | L-1 | M-1 | N-1 |
| Function | O | P | Q | T | U | V | W | X |
| Setting Contents | O-1 | P-1 | Q-1 | T-1 | U-1 | V-1 | W-1 | X-1 |

For facilitating description, in Table 1, respective denotations of the plurality of functions of MFP 1 are represented by alphabets such as A, B, C, D, and so on. In addition, for facilitating description, in Table 1, setting contents of each function are shown as A-1, B-1, C-4, D-2, and so on such that a function name has a numeric value as a suffix.

The function herein includes, for example, an image scanning function implemented by scanner portion 13, an image forming function implemented by printer portion 14, a function for adjusting a color formed on a sheet of paper (a color adjustment function), a function for adjusting a base of an image formed on a sheet of paper, and a function for negative-positive inversion.

Setting contents include scanning resolution for an image in connection with the image scanning function (300 dpi (dot per inch), 600 dpi, etc.), resolution in connection with the image forming function (the number of pixels), contents of a color in connection with the color adjustment function (full-color print, monochrome print, and the like), contents specifying whether to use the function for adjusting a base in forming the image (base adjustment ON/OFF), and contents specifying whether to use the function for negative-positive inversion in forming the image (negative-positive inversion ON/OFF).

In the present embodiment, setting contents of each function can be changed, for example, by user's selection of a setting content key displayed in a pop-up window as will be described later.

Function group storage unit 22 stores information for grouping functions of MFP 1. Table 2 schematically shows exemplary storage contents in function group storage unit 22.

TABLE 2

| Group | Function |
|---|---|
| Basic 1 | A, B, C, D, E |
| Basic 2 | F, G, H, I, J |
| Application | R, S, K, L, M, N, O, P, Q, R, T, U, V, W, X |

In Table 2, functions A, B, C, D, and so on shown in Table 1 are grouped into three groups of Basic 1, Basic 2, and Application. It is noted that CPU 10 can change functions belonging to each group based on information input by the user through hard key 15 or touch panel 201.

In the present embodiment, into which group each function is classified can be changed by the user's operation of hard key 15 or the like. It is noted that each function can belong only to a single group or can belong to a plurality of groups simultaneously. In the former case, when an operation to change a group to which a certain function belongs is performed, a configuration is such that the certain function is deleted from the group before the change is made. Namely, for example, when an operation to cause a function B belonging to Basic 1 group to belong to Application group is performed, function B is deleted from Basic 1 group.

In the present embodiment, it is assumed that a program executed by CPU 10 is stored in program storage unit 23, however, a program executed by CPU 10 may be stored in a recording medium 400 or downloaded from external equipment through an NIC (Network Interface Card) 60 which will be described later.

MFP 1 includes NIC 60 transmitting and receiving data such as image data to and from external equipment through such communication lines as public switched telephone network or LAN (Local Area Network). NIC 60 not only transmits and receives facsimile data through public switched telephone network but also transmits and receives data by making use of an e-mail system or a file transfer system through such networks as LAN and the Internet to and from external equipment connected to the network. Thus, MFP 1 has not only a function as a facsimile machine establishing normal facsimile communication but also a function as an e-mail transmission and reception terminal and a file transmission and reception terminal. It is noted that communication established by MFP 1 may be wired or wireless communication.

MFP 1 further includes a finisher 70 performing post-processing such as stapling of sheets of paper having an image formed by printer portion 14, a medium driver 40 performing processing for reading/writing of data from/into recording medium 400 removably attached to the main body of MFP 1, and a speaker 80 outputting sound. It is noted that hard key 15, touch sensor 200, display 100, scanner portion 13, and printer portion 14 are as described previously and description thereof will not be provided here.

Figure 3:
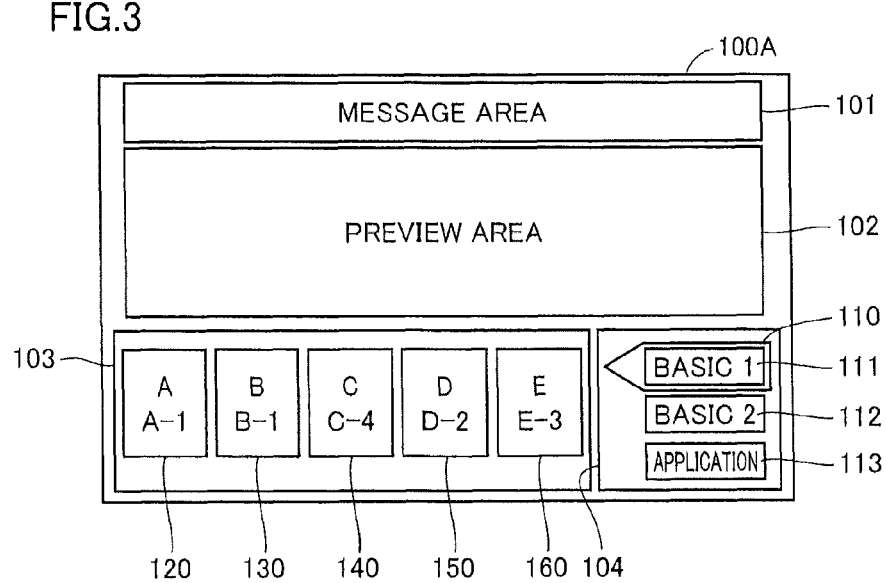
FIGS. 3 to 9 are diagrams showing examples of a screen displayed on a display of the MFP in FIG. 1.

In MFP 1, a screen for entering setting information on an image processing function of MFP 1 (a setting screen) is displayed on display 100. FIG. 3 shows an exemplary setting screen.

Referring to FIG. 3, a screen 100A includes a message area 101 displaying a state of MFP 1 at that time point or notification to a user and a preview area 102 displaying an image to be subjected to image processing, an image subjected to image processing (thumbnail preview), and the like.

In addition, screen 100A displays function keys 120, 130, 140, 150, and 160 corresponding to respective functions of MFP 1.

Function key 120 is a key, for example, for setting information for adjusting scanning resolution for an image in connection with the image scanning function implemented by scanner portion 13. Function key 130 is a key, for example, for entering setting information on contents of a color formed on a sheet of paper (a function to adjust full-color print, monochrome print, and the like (color adjustment function)) in connection with the image forming function implemented by printer portion 14. Function key 140 is a key, for example, for entering information for adjusting print density in connection with the image forming function of printer portion 14. Function key 150 is a key, for example, for entering setting information on a type of supplied paper in connection with the function to feed paper to printer portion 14 implemented by paper feed portion 18 or a key for entering information for setting magnification in connection with a size of an image formed on a sheet of paper with respect to an image size of a document in connection with the image forming function of printer portion 14. Function key 160 is a key, for example, for entering information on one-side/both-side in connection with a surface from which a document image is to be scanned and a surface of a sheet of paper on which an image is to be formed, in connection with the image forming function of printer portion 14.

Function keys 120, 130, 140, 150, and 160 each include a denotation of a function corresponding to the key and setting contents set at that time. In the case of function key 120 in FIG. 3, denotation of the function is "A" and the setting contents are "A-1". More specifically, in the case of function key 120, the denotation of the function is "scanning resolution" and the setting contents are "600 dpi" or the like.

The functions of MFP 1 are classified into any of a "Basic 1" group, a "Basic 2" group and an "Application" group, and group keys 111 to 113 corresponding to respective groups are displayed on screen 100A. Display 100 displays a function key corresponding to the group selected by the user, among the three groups above. Namely, a function key corresponding to the function belonging to the group selected by the user is displayed. For a group key corresponding to the group selected at that time point, a pointer 110 for indicating that the group has been selected is displayed. In the example in FIG. 3, the group key corresponding to "Basic 1" group (hereinafter may simply be referred to as "Basic 1 group key") is selected, and a function key corresponding to a function A belonging to "Basic 1" group (hereinafter may simply be referred to as the "A function key") 120, a B function key 130, a C function key 140, a D function key 150, and an E function key 160 are displayed.

In addition, in screen 100A, pointer 110 is displayed for the Basic 1 group key corresponding to the selected group. It is noted that a region in screen 100A where function keys 120 to 160 are displayed is referred to as a function selection area 103. Further, a region where group keys 111 to 113 are displayed is referred to as a group selection area 104.

Figure 4:
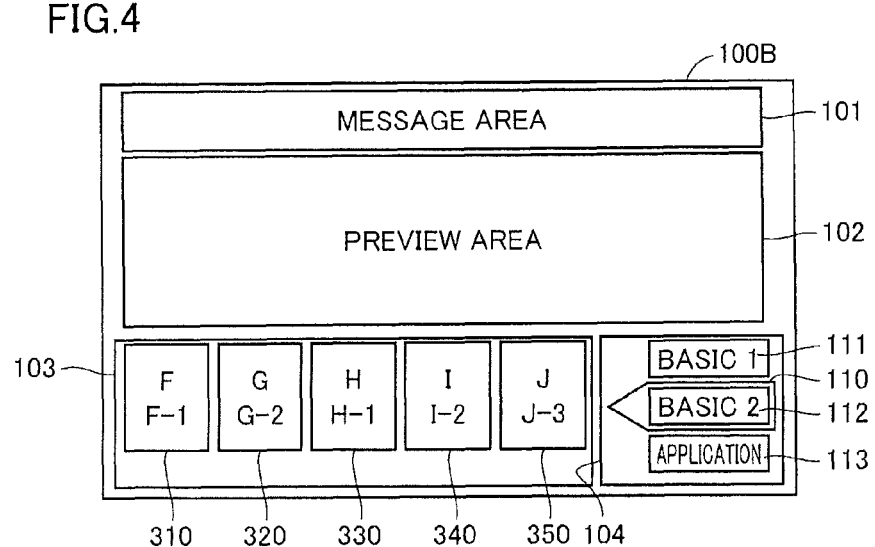

FIG. 4 is a diagram showing an example of a screen displayed on display 100 when the user selected Basic 2 group key 112 in screen 100A.

Referring to FIG. 4, in a screen 100B, pointer 110 is displayed as surrounding Basic 2 group key 112. Then, in function selection area 103 in screen 100B, instead of function keys 120 to 160 displayed in screen 100A in FIG. 3, an F function key 310, a G function key 320, an H function key 330, an I function key 340, and a J function key 350 corresponding to Basic 2 group are displayed.

Figure 5:
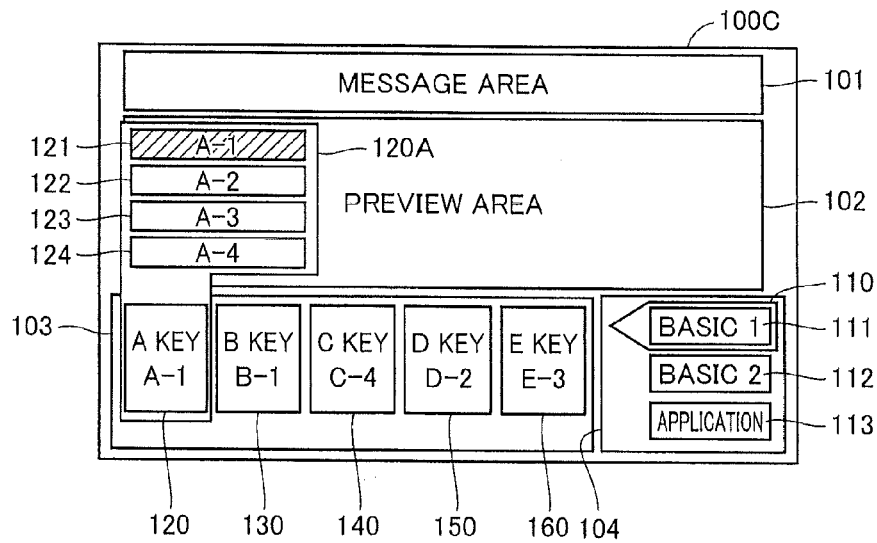

FIG. 5 is a diagram showing an example of a screen displayed on display 100 when A function key 120 is selected in screen 100A in FIG. 3.

When A function key 120 is selected in screen 100A in FIG. 3, as shown in a screen 100C in FIG. 5, a pop-up window 120A corresponding to A function key 120 is displayed. In pop-up window 120A, a plurality of candidates for setting contents of function A corresponding to A function key 120 are displayed as setting content keys 121 to 124. Setting content keys 121 to 124 include respective denotations of setting contents. In FIG. 5, "A-1", "A-2", "A-3", and "A-4" are displayed as denotations of the setting contents of function A by way of example. It is noted that the setting content key may be implemented by a symbol or the like representing setting contents instead of the denotation of the setting contents, or it is not limited to a denotation or a symbol so long as the user could understand the setting contents.

Among the plurality of setting content keys displayed in pop-up window 120A, a setting content key corresponding to the setting contents set (selected) at that time point is displayed in a manner different from a manner of display of other setting content keys (corresponding to the setting contents that are not set (selected)). FIG. 5 shows a state in which A-1 setting content key 121 is displayed in higher density, i.e., in density different from that of other setting content keys 122 to 124.

Pop-up window 120A is displayed as superimposed on preview area 102. In other words, in the same display screen 100C, pop-up window 120A is displayed in a region other than a region where a plurality of function keys belonging to Basic 1 group such as A function key 120, B function key 130, C function key 140, D function key 150, and E function key 160 are displayed. Thus, even when pop-up window 120A is displayed, the user can visually recognize these function keys 120 to 160 and can also operate (select) these keys.

Pop-up window 120A is closed on condition that a prescribed time period has elapsed since start of display of pop-up window 120A. Alternatively, pop-up window 120A is closed on condition that any of setting content keys 121 to 124 in pop-up window 120A is selected.

When any setting content key in pop-up window 120A is selected, a manner of display of the selected setting content key is changed. Namely, the selected setting content key is displayed in a manner different from that of other setting content keys. When A-2 setting content key 122 is selected in screen 100C in FIG. 5, display 100 displays a screen 100D in FIG. 6. In pop-up window 120A on screen 100D shown in FIG. 6, A-2 setting content key 122 is displayed in a manner different from that of other setting content keys 121, 123, and 124.

Then, after the setting content key displayed in such a different manner is changed, pop-up window 120A is closed.

In response to selection of A-2 setting content key 122 in pop-up window 120A, CPU 10 updates the setting contents of function A stored in setting content storage unit 21 (Table 1) from A-1 to A-2. For example, in a case where the function corresponding to A function key 120 is the "scanning resolution" and setting content A-1 is "600 dpi" and setting content A-2 is "300 dpi", as a result of selection of A-2 setting content key 122 as described previously, the setting contents of function A (scanning resolution) stored in setting content storage unit 21 are updated from "600 dpi" to "300 dpi".

Figure 6:
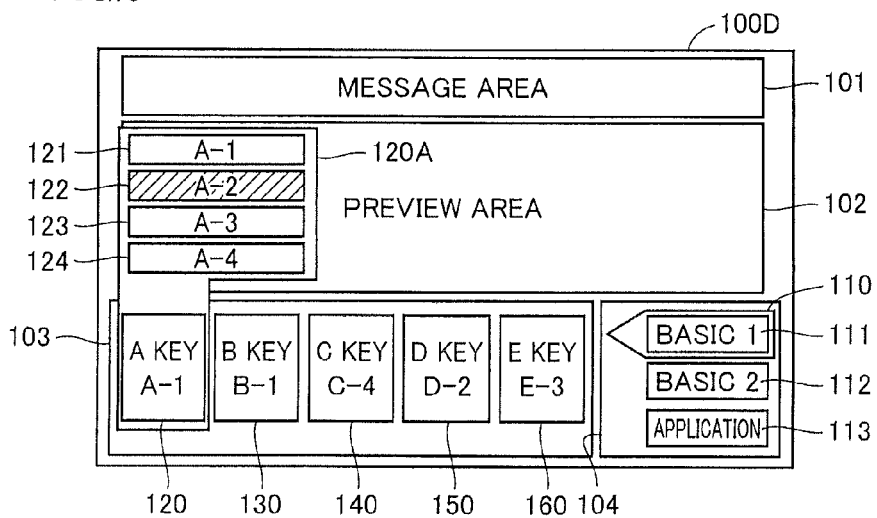
Figure 7:
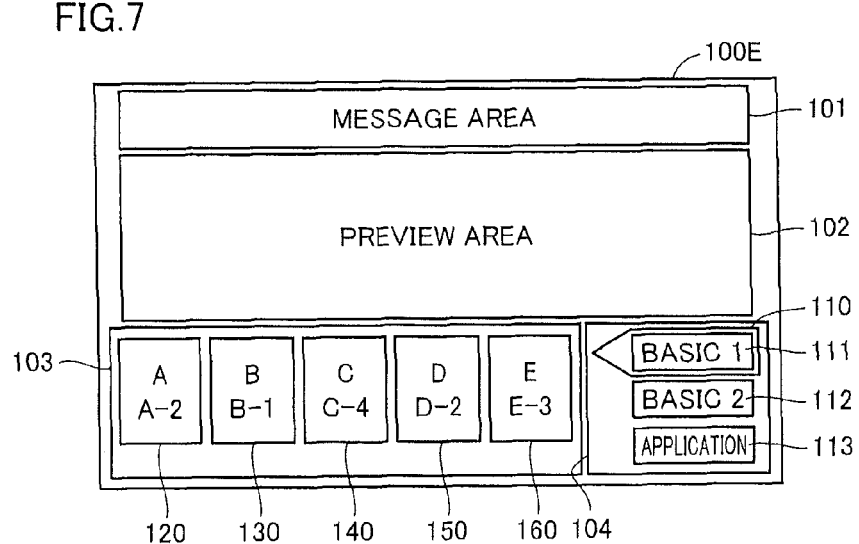

When A-2 setting content key 122 is selected in screen 100D shown in FIG. 6, pop-up window 120A is closed and display 100 displays a screen 100E in FIG. 7. Screen 100E in FIG. 7 is different from screen 100A in FIG. 3 only in display of the setting contents included in A function key 120. Namely, for A function key 120 in FIG. 7, the setting contents (A-2) corresponding to A-2 setting content key 122 selected in pop-up window 120A shown in FIG. 6 are displayed.

As described above with reference to FIGS. 5 to 7, when each key of A function key 120, B function key 130, C function key 140, D function key 150, and E function key 160 corresponding to Basic 1 group is selected, a pop-up window for selecting the setting contents (for example, pop-up window 120A in FIG. 5) is displayed.

It is noted that a pop-up window is similarly displayed also when each key of F function key 310, G function key 320, H function key 330, I function key 340, and J function key 350 corresponding to Basic 2 group shown in FIG. 4 is selected. Here, regarding a plurality of setting content keys displayed in the pop-up window as well, a setting content key corresponding to the setting contents set at that time point is displayed in a manner different from that of other setting content keys. In addition, even when the pop-up window is displayed as such, the user can visually recognize these function keys 310 to 350 and can also operate (select) these keys. Then, the pop-up window displayed here is also closed on condition that a prescribed time period has elapsed since start of display thereof or on condition that a setting content key in the pop-up window is selected, as in the case of pop-up window 120A. It is noted that, when any setting content key in the pop-up window is selected, as described with reference to FIGS. 5 and 6, the setting content key displayed in a manner different from that of other setting content keys is changed and thereafter the pop-up window is closed.

Regarding the functions of Basic 2 group as well, when the setting contents are changed by selecting a setting content key as described above or the like, the setting contents corresponding to each function stored in setting content storage unit 21 (Table 1) are updated to the contents after change. Here, the setting contents displayed in F function key 310, G function key 320, H function key 330, I function key 340, or J function key 350 are also updated to the contents after change.

Figure 8:
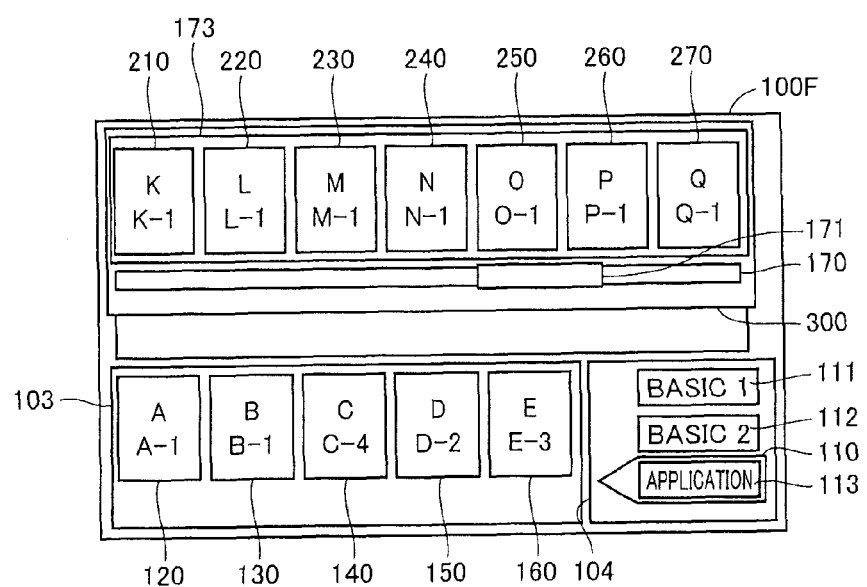

Meanwhile, when Application group key 113 is selected in screen 100A shown in FIG. 3, as shown in FIG. 8, function keys corresponding to the functions belonging to Application group are displayed as superimposed on message area 101 and preview area 102.

Specifically, when Application group key 113 is selected, display 100 displays a screen 100F in FIG. 8. In screen 100F, a scroll window 300 is displayed over message area 101 and preview area 102. In scroll window 300, function keys 210, 220, 230, 240, 250, 260, and 270 corresponding to the functions belonging to Application group are displayed. It is noted that an area in scroll window 300 where function keys are displayed is referred to as a function badge area 173.

Functions belonging to Application group include, for example, functions of which setting contents are relatively less frequently changed, such as a function for adjusting a base of an image to be formed on a sheet of paper or a function for negative-positive inversion.

In scroll window 300, a scroll track 170 and a slide gauge 171 are displayed other than function badge area 173 where function keys are displayed. For example, when an operation to slide gauge 171 to the left along scroll track 170 is performed, as shown in a screen 100G in FIG. 9, a position of display of slide gauge 171 is changed along scroll track 170 and a position of display of a function key displayed in function badge area 173 is also slid. Specifically, positions of display of keys 210, 220, 230, 240, and 250 are changed to move in a direction opposite to slide gauge 171 (to the right).

In screen 100G, keys 260 and 270 in screen 100F are not displayed in scroll window 300. This fact corresponds to movement to the outside of scroll window 300 as a result of movement in the direction the same as slide gauge 171. In screen 100G, keys 208 and 209 are displayed instead of keys 260 and 270.

Figure 10:
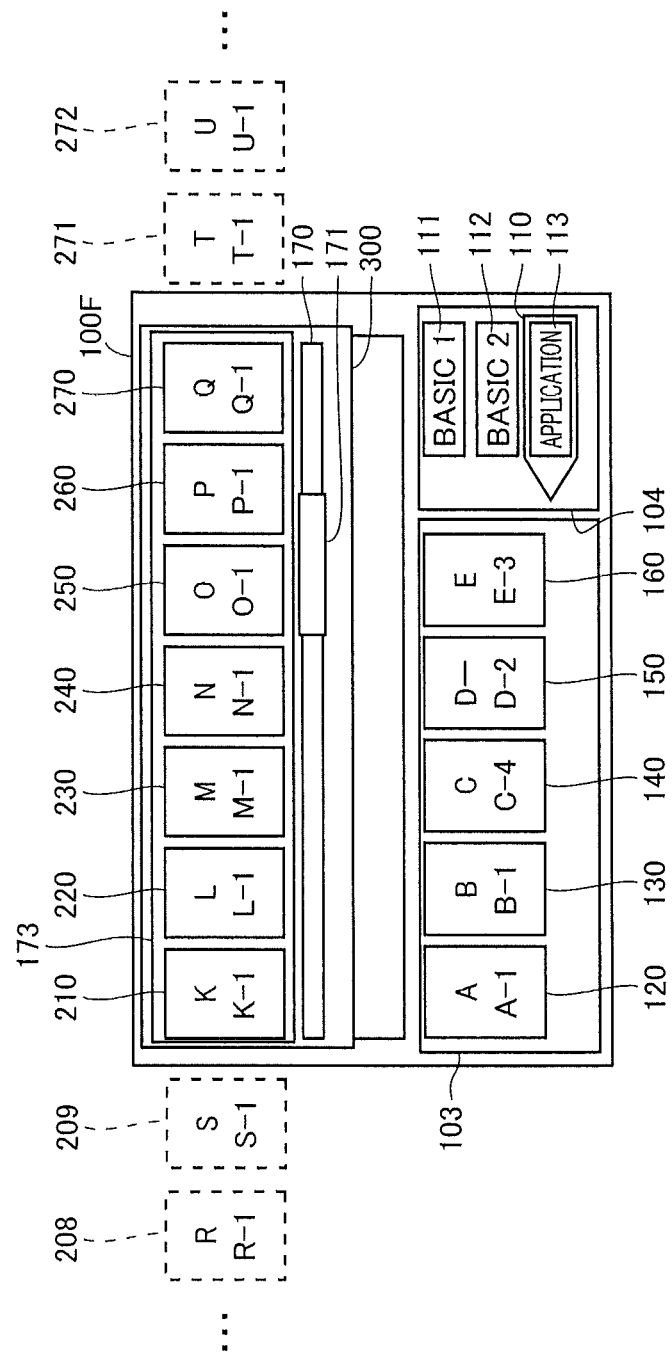
FIGS. 10 and 11 are diagrams for illustrating display contents on the display of the MFP in FIG. 1.
Figure 11:
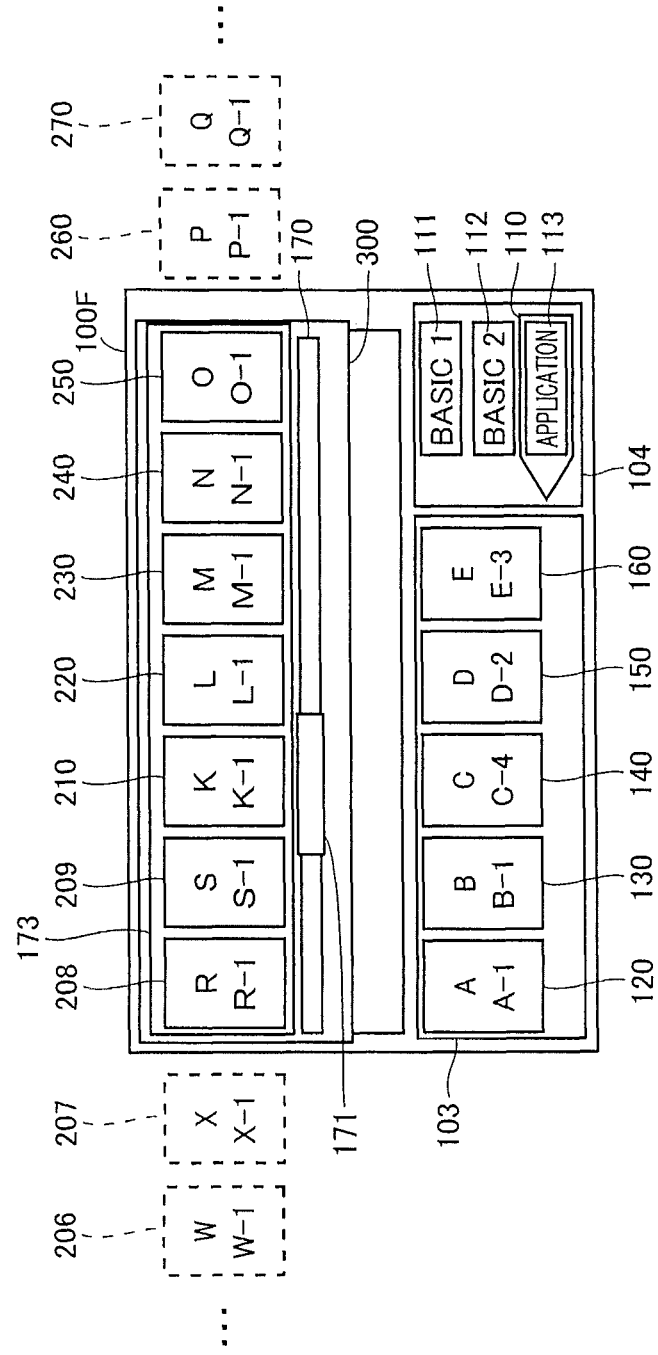

Namely, as shown in FIG. 10, function keys 208, 209, 210, 220, 230, 240, 250, 260, 270, 271, 272, and so on are virtually aligned in a prescribed direction (a direction along scroll track 170), including a region outside scroll window 300. As slide gauge 171 is moved from this state as shown in FIG. 11, these function keys 208, 209, 210, 220, 230, 240, 250, 260, 270, 271, 272, and so on move in a direction opposite to the direction of movement of slide gauge 171. Then, as a result of movement, keys located within scroll window 300 among function keys 208, 209, 210, 220, 230, 240, 250, 260, 270, 271, 272, and so on are displayed in screen 100F or screen 100G.

It is noted that function keys 208, 209, 210, 220, 230, 240, 250, 260, and 270 are function keys corresponding to functions belonging to Application group.

Figure 12:
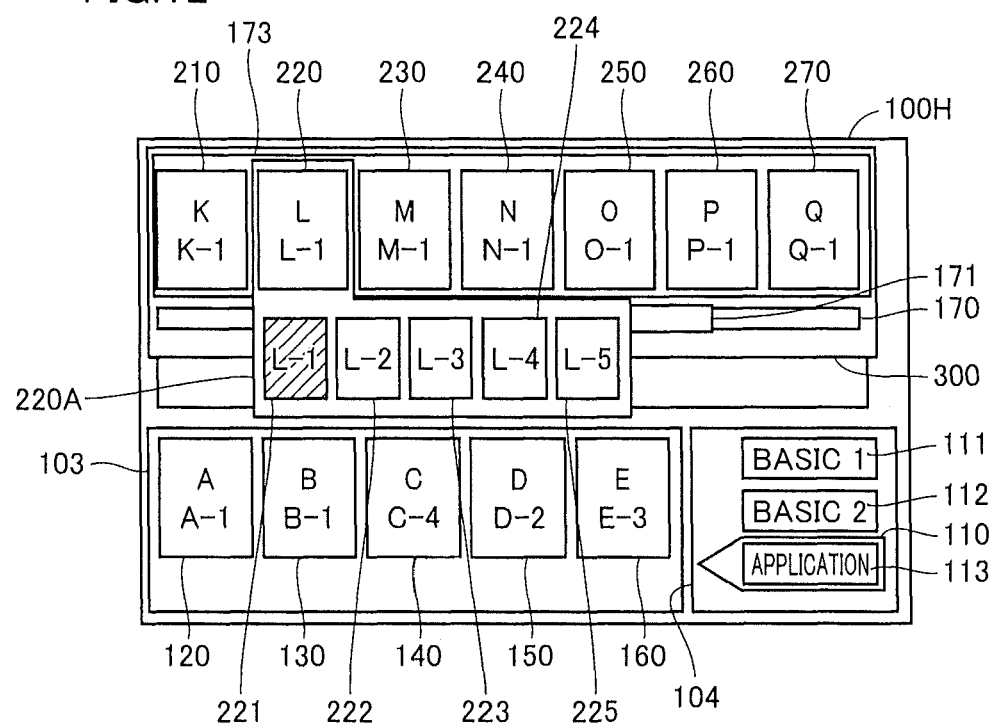
FIGS. 12 to 14 are diagrams showing examples of a screen displayed on the display of the MFP in FIG. 1.

For example, when L function key 220 in screen 100F shown in FIG. 8 is operated, a pop-up window 220A corresponding to L function key 220 is displayed as shown in a screen 100H in FIG. 12. In pop-up window 220A, a plurality of candidates for setting contents of function L corresponding to L function key 220 are displayed as setting content keys 221 to 225. Setting content keys 221 to 225 include respective setting contents ("L-1" to "L-5").

Among the plurality of setting content keys displayed in pop-up window 220A, a setting content key corresponding to the setting contents set (selected) at that time point is displayed in a manner different from a manner of display of other setting content keys. In other words, the setting content key corresponding to the setting contents stored as a setting value for function L in setting content storage unit 21 is displayed in a manner different from that of other setting content keys. FIG. 12 shows a state that L-1 setting content key 221 is displayed in higher density, i.e., in density different from that of other setting content keys 222 to 225.

Pop-up window 220A is displayed as superimposed on message area 101 and preview area 102. In other words, in the same display screen 100H, pop-up window 220A is displayed in a region other than a region (function selection area 103) where a plurality of function keys belonging to Basic 1 group such as A function key 120, B function key 130, C function key 140, D function key 150, and E function key 160 are displayed. Thus, even when pop-up window 220A is displayed, the user can visually recognize these function keys 120 to 160 and can also operate (select) these keys.

In addition, in the same display screen 100H, pop-up window 220A is preferably displayed in a region other than function badge area 173 where a plurality of function keys belonging to Application group such as function keys 208, 209, 210, 220, 230, 240, 250, 260, and 270 are displayed. Thus, the user can visually recognize the function keys displayed in function badge area 173 even when pop-up window 220A is displayed.

Pop-up window 220A is closed on condition that a prescribed time period has elapsed since start of display of pop-up window 220A, as in the case of pop-up window 120A shown in FIGS. 5 and 6 described previously. Alternatively, pop-up window 220A is closed on condition that any of setting content keys 221 to 225 in pop-up window 220A is selected.

When any setting content key in pop-up window 220A is selected, a manner of display of the selected setting content key is changed. Namely, the selected setting content key is displayed in a manner different from that of other setting content keys. In response to selection of a setting content key in pop-up window 220A, CPU 10 updates the setting contents of function L stored in setting content storage unit 21 with the setting contents corresponding to the selected setting content key.

In the present embodiment described above, function keys corresponding to the functions belonging to Basic 1 group are displayed in function selection area 103 in response to selection of Basic 1 group key 111 (FIG. 3). In addition, similarly, function keys corresponding to the functions belonging to Basic 2 group are also displayed in function selection area 103 in response to selection of Basic 2 group key 112 (FIG. 4). On the other hand, function keys corresponding to the functions belonging to Application group are displayed in scroll window 300 displayed on the display in response to selection of Application group key 113. Scroll window 300 is displayed over message area 101 and preview area 102 (FIG. 8).

When a function key corresponding to the function belonging to Basic 1 group is selected, a pop-up window corresponding to the function key (120A in FIG. 5) is displayed. In the pop-up window, candidates for the setting contents of the function corresponding to the selected function key are displayed as the setting content keys. The pop-up window is displayed in a region other than function selection area 103. Namely, the pop-up window is displayed in a region other than a region where function keys corresponding the functions belonging to Basic 1 group are displayed.

When one of the function keys corresponding to the functions belonging to Basic 2 group is selected while they are displayed on display 100, as in the case of Basic group 1, a pop-up window corresponding to the selected function key is displayed. The pop-up window is displayed in a region other than function selection area 103. Namely, the pop-up window is displayed in a region other than the region where the function keys corresponding to the functions belonging to Basic 2 group are displayed.

In the present embodiment, function keys belonging to the first group corresponding to Basic 1 group key 111 and Basic 2 group key 112 represent the "first key", and function keys belonging to the second group corresponding to Application group key 113 represent the "second key". It is noted that information on with which function setting each function key in the groups corresponding to Basic 1 group key 111, Basic 2 group key 112 and Application group key 113 should be associated is stored in function group storage unit 22. The information may set in advance in MFP 1 or may be set based on an operation of hard key 15 or touch sensor 200.

For example, in MFP 1, by default, keys in a group corresponding to Basic 1 group key 111 and Basic 2 group 112 are associated with setting of functions of which setting contents are expected to frequently be entered, such as the number of copies, choice of paper and magnification of print, and keys in a group corresponding to Application group key 113 are associated with setting of functions of which setting contents are expected to relatively less frequently be entered, such as base adjustment and negative-positive inversion. Such association can be changed in response to a user's operation.

As described with reference to FIGS. 8 to 11, when an operation to change a position of display of slide gauge 171 (for example, an operation to drag slide gauge 171) is performed, keys displayed in scroll window 300 are changed. A manner of display in changing keys to be displayed in scroll window 300 is preferably scroll display. Function keys 210 to 270 in FIG. 8 are scrolled in a direction opposite to the direction of movement of slide gauge 171 (to the right) so that screen 100G is displayed on display 100. As the screen is scrolled to the right, function key 260 and function key 270 are located outside screen 100G, and thus these keys are not displayed in screen 100G. On the other hand, since function keys 208 and 209 enter screen 100G as a result of scrolling, these keys are displayed in screen 100G.

Figure 13:
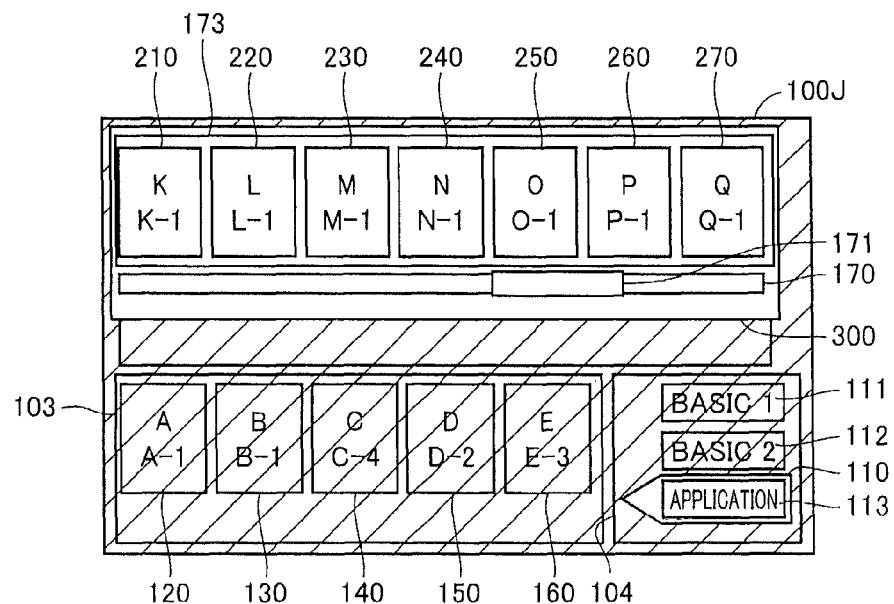

In the present embodiment, when scroll window 300 is displayed on display 100, as shown in a screen 100J in FIG. 13, a region other than scroll window 300 and Application group key 113 may be grayed out, so that scroll window 300 and Application group key 113 may intensely be displayed.

In addition, in the present embodiment, in response to change in display on display 100, sound may be output from speaker 80. For example, exemplary sound includes sound effects in display of pop-up window 120A or in scroll display of scroll window 300.

Figure 14:
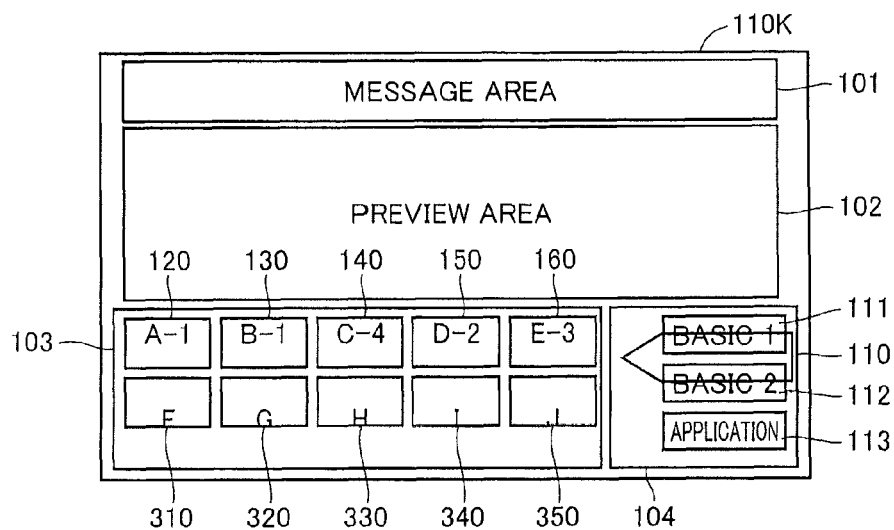

Moreover, in the present embodiment, scroll display may be provided also when keys displayed on display 100 are changed from the keys in the group corresponding to Basic 1 group key 111 to the keys in the group corresponding to Basic 2 group key 112 as Basic 2 group key 112 is operated. In such scroll display, as shown in a screen 110K in FIG. 14, a lower portion of function keys 120 to 160 and an upper portion of function keys 310 to 350 are temporarily displayed simultaneously. Further, pointer 110 also moves from the position surrounding Basic 1 group key 111 to a position surrounding Basic 2 group key 112 by scrolling.

Figure 15:
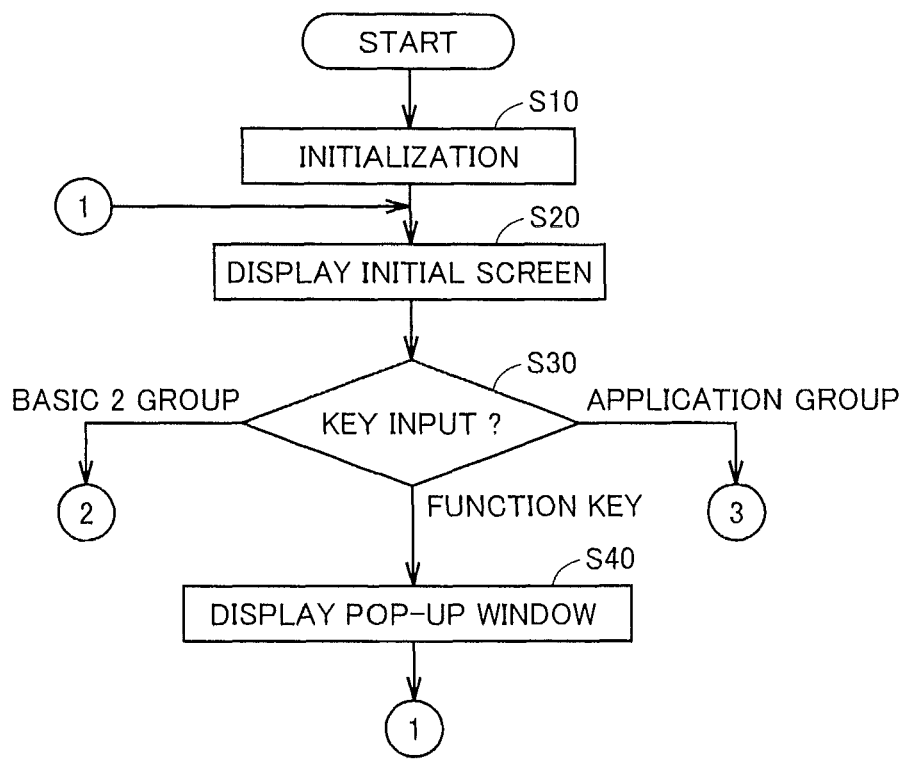
FIGS. 15 to 17 are flowcharts showing processing performed in the MFP in FIG. 1.
Figure 16:
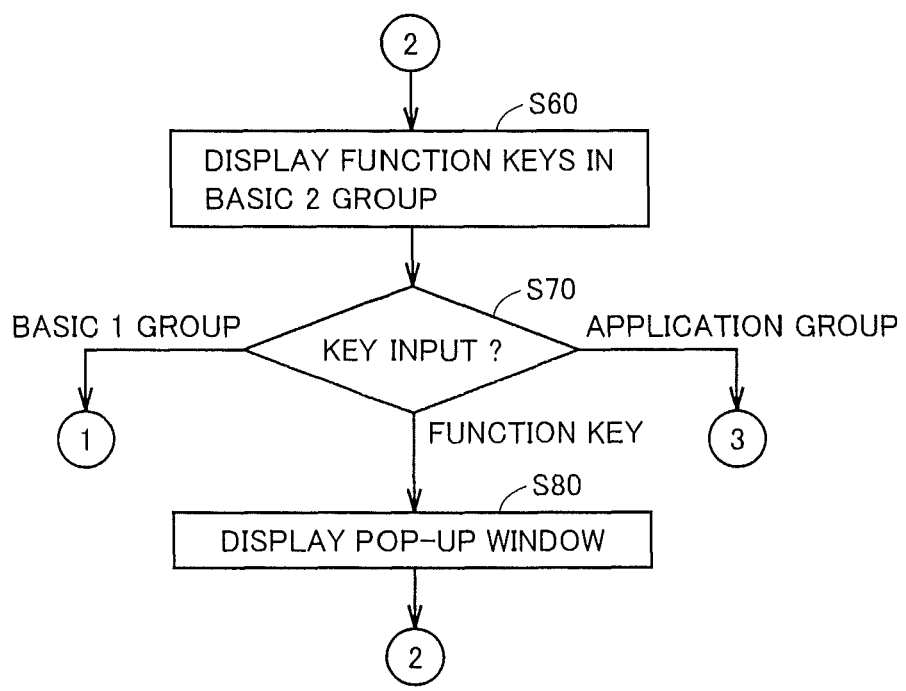
Figure 17:
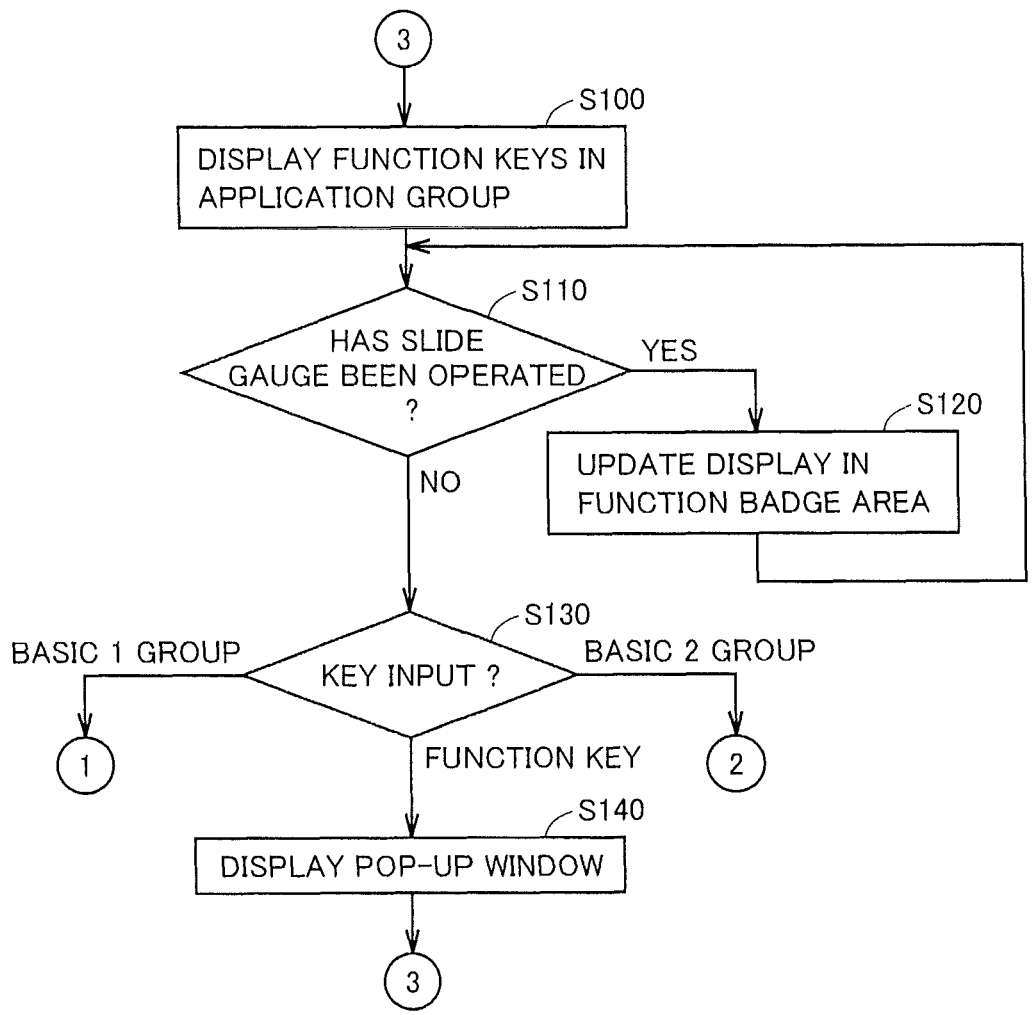

FIGS. 15 to 17 are flowcharts showing contents of processing performed by CPU 10 for controlling display on the display in MFP 1 in the present embodiment. CPU 10 reads a program stored in program storage unit 23 and performs processing shown in FIGS. 15 to 17. Contents in processing for controlling display on the display will be described hereinafter with reference to FIGS. 15 to 17.

Referring first to FIG. 15, when power of MFP 1 is turned on, CPU 10 initializes various settings of MFP 1 in step S10 and the process proceeds to step S20.

In step S20, CPU 10 causes display 100 to display an initial screen and the process proceeds to step S30. The initial screen can be a screen in which function keys 120 to 160 corresponding to Basic 1 group are displayed, for example, as shown in FIG. 3.

In step S30, CPU 10 waits until a key displayed on touch panel 201 is selected. When the key is selected, CPU 10 determines which key has been selected and proceeds with processing in accordance with the selected key. When it is determined that Basic 2 group key 112 has been selected ("Basic 2 group key" in step S30), the process proceeds to step S60 (FIG. 16). When it is determined that Application group key 113 has been selected ("Application group key" in step S30), the process proceeds to step S100 (FIG. 17). When it is determined that any of function keys 120 to 160 belonging to Basic 1 group has been selected ("function key" in step S30), the process proceeds to step S40.

In step S40, as described with reference to FIGS. 5 and 6, CPU 10 performs processing for displaying pop-up window 120A corresponding to the function key selected in step S30 and accepting selection of a setting content key in the pop-up window, and the process returns to step S20.

When it is determined in step S30 that Basic 2 group key has been selected ("Basic 2 group key" in step S30), in step S60 in FIG. 16, CPU 10 causes display of function keys 310 to 350 corresponding to the functions belonging to the Basic 2 group in function selection area 103 as shown in FIG. 4 and the process proceeds to step S70.

CPU 10 waits until a key displayed on display 100 is selected through touch sensor 200, and when the key is selected, CPU 10 proceeds with processing in accordance with the selected key. When it is determined that Basic 1 group key 111 has been operated ("Basic 1 group key" in step S70), the process proceeds to step S20 (FIG. 15). When it is determined that Application group key 113 has been operated ("Application group key" in step S70), the process proceeds to step S100 (FIG. 17). When it is determined that any of function keys 310 to 350 belonging to Basic 2 group has been selected ("function key" in step S70), the process proceeds to step S80.

In step S80, CPU 10 performs processing for displaying a pop-up window corresponding to the function key selected in step S70 and accepting selection of a setting content key in the pop-up window, and the process returns to step S60.

When it is determined that Application group key has been selected in step S30 in FIG. 15 ("Application group key" in step S30) or when it is determined that Application group key has been selected in step S70 in FIG. 16 ("Application group key" in step S70), the processing in step S100 in FIG. 17 is performed. In step S100, CPU 10 causes display 100 to display scroll window 300 as shown in FIG. 8 and the like and causes a prescribed number of function keys among the function keys belonging to Application group to be displayed in function badge area 173, and the process proceeds to step S110.

Then, in step S110, CPU 10 determines whether an operation to move slide gauge 171 has been performed on touch sensor 200 or not. When it is determined that an operation to move slide gauge 171 has been performed (YES in step S110), the process proceeds to step S120. When it is determined that an operation to move slide gauge 171 has not been performed (NO in step S110), the process proceeds to step S130.

Figure 9:
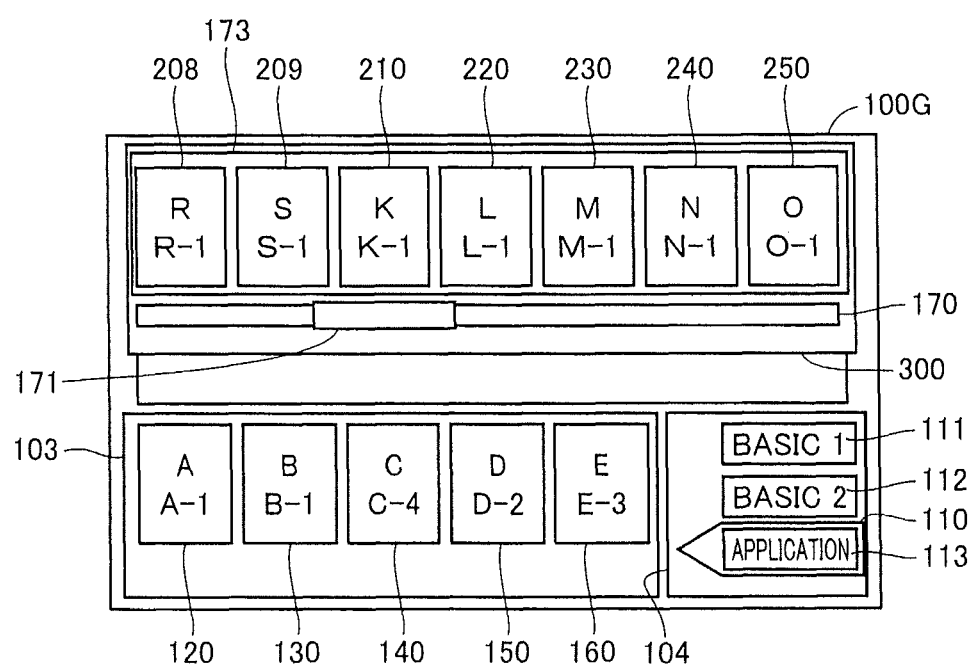

In step S120, CPU 10 slides display of the function keys in function badge area 173 in scroll window 300, in accordance with an amount of movement of slide gauge 171, as described with reference to FIGS. 8 and 9.

When it is determined in step S110 that an operation to move slide gauge 171 has not been performed (NO in step S110), in step S130, selection of a key displayed on touch panel 201 is awaited. When the key is selected, which key has been selected is determined and the process proceeds in accordance with the selected key. When it is determined that Basic 1 group key 111 has been selected ("Basic 1 group key" in step S130), the process proceeds to step S20 (FIG. 15). When it is determined that Basic 2 group key 112 has been selected ("Basic 2 group key" in step S130), the process proceeds to step S60 (FIG. 16). When it is determined that any of the function keys belonging to Application group 113 has been selected ("function key" in step S130), the process proceeds to step S140.

In step S140, CPU 10 performs processing for displaying a pop-up window corresponding to the function key selected in step S130 and accepting selection of a setting content key in the pop-up window as described with reference to FIG. 12, and the process returns to step S100.

In the present embodiment described above, a plurality of functions that can be achieved by MFP 1 are classified into Basic 1 group, Basic 2 group and Application group.

The function keys (function keys 120 to 160, 310 to 350) for changing setting contents of functions in Basic 1 group and Basic 2 group are displayed in function selection area 103. When each function key is selected, a pop-up window is displayed, and a plurality of setting content keys for selecting the setting contents of the function corresponding to the selected function key are displayed in the pop-up window.

Here, the pop-up window above is displayed so as not to hinder visual recognition of the function keys (function keys 120 to 160 or function keys 310 to 350) displayed in function selection area 103. Thus, even when the pop-up window above is displayed, the user can see all the function keys that have been displayed in function selection area 103 before the pop-up window is displayed. Namely, the user can select a setting content key displayed in the pop-up window while viewing the setting contents in connection with all the function keys. Therefore, the user can select setting contents of a certain function while viewing setting contents of another function.

In addition, in the present embodiment, function keys (function keys 208, 209, 210, 220, 230, 240, 250, 260, 270, 271, and 272) for changing setting of a function in Application group are displayed in scroll window 300 not superimposed on function selection area 103. Thus, in setting each function in Application group as well, the user can visually recognize the setting contents of Basic 1 group or Basic 2 group. Moreover, as a function key in Application group is operated, a pop-up window for displaying setting contents of each function key is displayed. Even when this pop-up window is displayed, however, the user can visually recognize the setting contents of Basic 1 group or Basic 2 group.

Further, function keys displayed in scroll window 300 among the plurality of function keys in Application group can be changed by scrolling. Thus, regarding Application group, a greater number of function keys can be displayed in a limited area.

Thus, in the present embodiment, how corresponding function keys are displayed differs between Basic 1 group, Basic 2 group and Application group. Thus, many functions can be changed depending on nature of the function. Specifically, for a function of which setting contents are expected to frequently be entered, a key for that setting (and setting contents thereof) is always displayed. Regarding a function of which setting contents are expected to relatively less frequently be entered, a key displayed on a touch panel, among the keys for such setting, can be replaced by scrolling.

In addition, the user can update storage contents in function group storage unit 22 by operating hard key 15 or touch panel 201. Thus, in the present embodiment, the user can change which function should belong to Basic 1 group or Basic 2 group or which function should belong to Application group. Thus, MFP 1 can be customized to improve user operability.

The present invention is naturally applicable also to a case where the present invention is achieved by supplying a program to an image processing apparatus. In addition, the effects of the present invention can be achieved also by supply of a recording medium (recording medium 400) storing a program implemented by software for achieving the present invention to a system or an apparatus and reading and execution of program codes stored in the recording medium by the system or a computer (or a CPU or an MPU (Micro-Processing Unit)) of the apparatus.

In this case, the program codes themselves read from the recording medium implement the functions of the embodiments described previously and the recording medium storing the program codes implements the present invention.

In addition, such a case that not only the functions of the embodiments described previously are implemented by executing the program codes read by the computer but also the functions of the embodiments described previously are implemented by actual processing partially or entirely performed by an OS (operating system) operating on the computer based on an instruction from the program codes is naturally encompassed.

Further, such a case that the program codes read from the recording medium are written in a memory included in a function expansion board inserted in the computer or a function expansion unit connected to the computer and thereafter the functions of the embodiments described previously are implemented by actual processing partially or entirely performed by a CPU or the like included in the function expansion board or the function expansion unit based on an instruction from the program codes is naturally encompassed.

Examples of the recording media include media storing a program in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like.

According to the present embodiment described above, some of a plurality of keys in the second group are displayed in a replaceable manner in the second region which is a region other than a region where keys in the first group are displayed. Therefore, the second region does not have to have a size large enough to display all keys in the second group, and thus a region for displaying the keys in the first group can be prevented from becoming too small.

In addition, since the second region for displaying the keys in the second group is set as a region other than the first region where the keys in the first group are displayed, the keys in the first group can always be displayed on the image processing apparatus.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus capable of implementing a plurality of functions, said plurality of functions including functions belonging to a first group and functions belonging to a second group, comprising:
    a display device;
    a selection accepting unit for accepting selection of any of said first group and said second group;
    a first display control unit for causing said display device to display in a predetermined first region in its display screen a plurality of first keys corresponding to respective functions belonging to said first group, regardless of which of said first group and said second group has been selected; and
    a second display control unit for causing, when said second group is selected, said display device to display in a second region in said display screen other than said first region where said first keys are displayed, second keys corresponding to respective functions belonging to said second group, wherein
    said second display control unit displays more than one key of said second keys in said second region such that said more than one key of said second keys are aligned in a given direction and can be scrolled,
    said first keys and said second keys are capable of belonging to both said first group and said second group, and
    said image processing apparatus further comprises a grouping unit for grouping said first keys and said second keys such that they each belong to at least one of said first group and said second group.

2. The image processing apparatus according to claim 1, further comprising a third display control unit for causing, when any of the second keys displayed under control by said second display control unit is selected, said display device to display in a region in said display screen other than said first region where said first keys are displayed, a third key for accepting setting contents of a function belonging to the second group corresponding to the selected second key.

3. The image processing apparatus according to claim 2, wherein
said third display control unit causes said display device to display said third key in a region in said display screen other than the second region where said second keys are displayed.

4. The image processing apparatus according to claim 1, wherein said first display control unit causes said display device to always display all of said first keys belonging to said first group in said first region regardless of the group that is selected by said selection accepting unit.

5. A non-transitory storage medium storing a program executed in a computer mounted on an image processing apparatus including a display device and capable of implementing a plurality of functions, said plurality of functions including functions belonging to a first group and functions belonging to a second group, said program causing said computer to perform the steps of:
  accepting selection of any of said first group and said second group;
  causing said display device to display in a predetermined first region in its display screen a plurality of first keys corresponding to respective functions belonging to said first group, regardless of which of said first group and said second group has been selected; and
  causing, when said second group is selected, said display device to display in a second region in said display screen other than said first region where said first keys are displayed, second keys corresponding to respective functions belonging to said second group, wherein
  more than one key of said second keys is displayed in said second region such that said more than one key of said second keys are aligned in a given direction and can be scrolled,
  said first keys and said second keys are capable of belonging to both said first group and said second group, and
  said program causing said computer to perform the further step of grouping said first keys and said second keys such that they each belong to at least one of said first group and said second group.

6. The non-transitory storage medium according to claim 5, wherein said program further causes said computer to perform the step of displaying, when any of said second keys is selected, a third key for accepting setting contents in connection with the second group corresponding to the selected second key in a region other than said first region where said first keys are displayed.

7. The non-transitory storage medium according to claim 6, wherein in said step of displaying a third key, said third key is displayed in a region other than the second region where said second keys are displayed.

8. The non-transitory storage medium according to claim 5, wherein all of said first keys belonging to said first group in said first region is always displayed regardless of the group that is selected and accepted.

9. A control method for controlling an image processing apparatus including a display device and capable of implementing a plurality of functions, said plurality of functions including functions belonging to a first group and functions belonging to a second group, comprising the steps of:
  said image processing apparatus accepting selection of any of said first group and said second group;
  said image processing apparatus causing said display device to display, in a predetermined first region in its display screen, a plurality of first keys corresponding to respective functions belonging to said first group, regardless of which of said first group and said second group has been selected; and
  said image processing apparatus causing, when said second group is selected, said display device to display in a second region in said display screen other than said first region where said first keys are displayed, second keys corresponding to respective functions belonging to said second group, wherein
  more than one key of said second keys is displayed in said second region such that said more than one key of said second keys are aligned in a given direction and can be scrolled,
  said first keys and said second keys are capable of belonging to both said first group and said second group, and
  said image processing apparatus grouping said first keys and said second keys such that they each belong to at least one of said first group and said second group.

10. The control method for controlling an image processing apparatus according to claim 9, further comprising the step of displaying, when any of said second keys is selected, a third key for accepting setting contents in connection with the second group corresponding to the selected second key in a region other than said first region where said first keys are displayed.

11. The control method for controlling an image processing apparatus according to claim 10, wherein
  in said step of displaying a third key, said third key is displayed in a region other than the second region where said second keys are displayed.

12. The control method for controlling an image processing apparatus according to claim 9, wherein said image processing apparatus causing said display device to always display all of said first keys belonging to said first group in said first region regardless of the group that is selected by said selection accepting unit.

* * * * *